United States Patent
Watanabe

(10) Patent No.: US 8,411,228 B2
(45) Date of Patent: Apr. 2, 2013

(54) LIGHT EMITTING MODULE, BACKLIGHT UNIT AND LIQUID CRYSTAL DISPLAY DEVICE

(75) Inventor: Chihiro Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 12/919,776

(22) PCT Filed: Oct. 28, 2008

(86) PCT No.: PCT/JP2008/069505
§ 371 (c)(1),
(2), (4) Date: Aug. 27, 2010

(87) PCT Pub. No.: WO2009/110134
PCT Pub. Date: Sep. 11, 2009

(65) Prior Publication Data
US 2011/0001900 A1    Jan. 6, 2011

(30) Foreign Application Priority Data
Mar. 7, 2008 (JP) .................. 2008-057971

(51) Int. Cl.
*G02F 1/1335* (2006.01)

(52) U.S. Cl. ........... 349/62; 349/56; 349/58; 349/60; 349/61

(58) Field of Classification Search ........... 349/56, 349/58, 60, 61, 62
See application file for complete search history.

(56) References Cited

U.S. PATENT DOCUMENTS

| | | | |
|---|---|---|---|
| 8,129,740 B2 * | 3/2012 | Choi et al. | ............ 257/99 |
| 2005/0141244 A1 | 6/2005 | Hamada et al. | |
| 2006/0238367 A1 | 10/2006 | Tsuchiya | |
| 2008/0316770 A1 * | 12/2008 | Oku et al. | ............ 362/617 |

FOREIGN PATENT DOCUMENTS

| | | |
|---|---|---|
| JP | 2005-196989 A | 7/2005 |
| JP | 2006-302710 A | 11/2006 |
| JP | 2007-258043 A | 10/2007 |

* cited by examiner

*Primary Examiner* — Jennifer Doan
(74) *Attorney, Agent, or Firm* — Birch, Stewart, Kolasch & Birch, LLP

(57) ABSTRACT

A plurality of LEDs (12) include an LED group (12G) wherein the LEDs are arranged in a row, and at least one LED (12T) not in the row. The position of the LED group (12G) in a row on a light guide plate (41) is specified by bringing the LED (12T) into contact with the light guide plate (41).

16 Claims, 4 Drawing Sheets

US 8,411,228 B2

LIGHT EMITTING MODULE, BACKLIGHT UNIT AND LIQUID CRYSTAL DISPLAY DEVICE

TECHNICAL FIELD

The present invention relates to a light emitting module that incorporates a light emitting element, a backlight unit that incorporates the light emitting module, and further a liquid crystal display device that incorporates the backlight unit.

BACKGROUND ART

Conventionally, various backlight units that supply light to a liquid crystal display panel (non-light emitting type display panel) of a liquid crystal display device are developed. As an example of a backlight unit, there is a side-light type backlight unit described in a patent document 1. This backlight unit, as shown in a plan view of FIG. 3A, receives light from a LED (Light Emitting Diode) 112 via a side surface 141S of a light guide plate 141; and emits the light from a top surface 141U (here, a board on which the LED 112 is mounted is called a mount board 111).

And, in this backlight unit, to prevent light-amount unevenness (brightness unevenness) from occurring in the emitted light, the side surface 141S of the light guide plate 141 is formed into a saw-tooth shape; especially, a vertical angle is suitably designed (see FIG. 3B that is an enlarged view of FIG. 3A). According to this, the light from the LED 112 (light emitting element) efficiently enters the light guide plate 141, so that brightness unevenness becomes unlikely to occur.

Patent document 1: JP-A-2006-302710

DISCLOSURE OF THE INVENTION

Problems to be Solved by the Invention

However, the LED 112 used in the backlight unit has various characteristics (emitted-light directivity, light intensity and the like). And, the saw-tooth shape of the light guide plate 141 must change in accordance with the characteristics. However, to change the saw-tooth shape, it becomes necessary to remake a mold to form the light guide plate 141. And, the remake cost is very high.

Besides, as shown in a plan view of FIG. 4, the side surface 141S of the light guide plate 141 and a light emitting surface 112F of the LED 112 come into contact with each other to produce a dark region bk, so that there is also a backlight unit in which light-amount unevenness due to the dark region occurs (here, a broken-line region in FIG. 4 means a light supply region ar of the backlight unit that supplies light to an effective display region of a liquid crystal display panel. Besides, a region drawn by reticulate points means that sufficient light is supplied to the light guide plate 141; and a line im is an imaginary line that represents a divergent state of the light from a single LED 112).

As a measure to prevent such light-amount unevenness, in the backlight unit, the side surface 141S of the light guide plate 141 and the light emitting surface 112F of the LED 112 are disposed away from each other by a suitable distance and the divergent light from the LED 112 is input into the side surface 141S of the light guide plate 141, so that brightness unevenness may be prevented.

However, in such backlight unit, for example, the mount board 111 and the light guide plate 141 must be suitably situated with respect to a housing of the backlight unit; and further, the LED 112 must be also suitably situated with respect to the mount board 111.

In other words, in such backlight unit, a tolerance of the mount board 111 with respect to the housing, a tolerance of the light guide plate 141 with respect to the hosing and a tolerance of the LED 112 with respect to the mount board 111 cause the distance between the side surface 141S of the light guide plate 141 and the light emitting surface 112F of the LED 112 to become different from a desired distance. Accordingly, in this backlight unit, it is hard for the distance between the side surface 141S of the light guide plate 141 and the light emitting surface 112F of the LED 112 to become as designed, so that the brightness unevenness is unlikely to be resolved (in short, the production burden is extremely heavy for resolution of the brightness unevenness).

The present invention has been made in light of the above situation. And, it is an object of the present invention to provide: a light emitting module that prevents brightness unevenness easily at a low cost and is necessary for a backlight unit; a backlight unit that includes the light emitting module; and further a liquid crystal display device that includes the backlight unit.

Means for Solving the Problem

The light emitting module supplies light to a light guide plate and includes: a light emitting element; and a support board which arranges and supports the light emitting element. And, in this light emitting module, a group of linear light emitting elements that are arranged in a line is included; and at least a deviating light emitting element that deviates from the line is included. And, the deviating light emitting element comes into contact with the light guide plate, so that a position of the group of linear light emitting elements with respect to the light guide plate is defined.

According to this, the group of linear light emitting elements is positioned away from the light guide plate. Accordingly, the light from the group of linear light emitting elements diverges and reaches the light guide plate; and because of this, there is no light-amount unevenness in the light emitted from the light guide plate. In other words, even if no machining is applied to the light guide plate, this light emitting module prevents light-amount unevenness in the emitted light from the light guide plate.

In addition, other members are not necessary for the positioning of the light emitting module with respect to the light guide plate. Besides, because the position of the light emitting module with respect to the light guide plate is decided by only applying the deviating light emitting element to the light guide plate, the production burden is slight.

Here, it is desirable that the light emitting element is of a side-surface light emitting type that emits light in the same direction as an in-the-board surface direction of the support board.

This is because it is possible to change the position of a light emitting element of such side-surface light emitting type in the light emission direction of the light emitting element.

Besides, it is desirable that the deviating light emitting element is situated at one end or both ends of the line of the group of linear light emitting elements.

Because the deviating light emitting element is in contact with the light guide plate, it is hard for the deviating light emitting element to supply the divergent light to the incident surface of the light guide plate. However, if the deviating light emitting element is situated at one end or both ends of the group of linear light emitting elements, the light that does not diverge reaches only one end or both ends of the incident surface of the light guide plate. Because of this, the disadvantage (light-amount unevenness) due to the input of the not-divergent light into the light guide plate is slight.

Besides, in the light emitting module, it is desirable that the following conditional formula (1) is met. This conditional formula (1) means that the deviating light emitting element is supported by the support board in accordance with a predetermined design (in short, the deviating light emitting element deviates by a distance longer than a difference of a tolerance between the light emitting elements).

$$AD < DD \quad \text{conditional formula (1)}$$

where

AD: a distance of a tolerance between the light emitting elements that occurs in a direction which intersects the line of the light emitting elements in a case where the light emitting element is supported by the support board.

DD: a distance between the deviating light emitting element and the group of the light emitting elements in a direction that intersects the line of the light emitting elements.

Here, it is desirable that the support board is a circuit board that includes a wiring that guides an electric current to the light emitting element. And, as such a circuit board, there is a flexible circuit board or a hard circuit board. Besides, as an example of the light emitting element, there is a LED.

Here, it is possible to say that a backlight unit including the above light emitting module and a light guide plate that receives light from the light emitting module is also the present invention; and further it is possible to say that a liquid crystal display device including the backlight unit; and a liquid crystal display panel that receives light from the backlight unit is also the present invention.

Advantages of the Invention

According to the light emitting module of the present invention, it is possible to perform the positioning of the light emitting module with respect to the light guide plate without using any additional members. In addition, because the light that enters the light guide plate diverges and is input into the light guide plate, because of this, the light emitted from the light guide plate does not have light-amount unevenness.

LIST OF REFERENCE SYMBOLS

Figure 1:
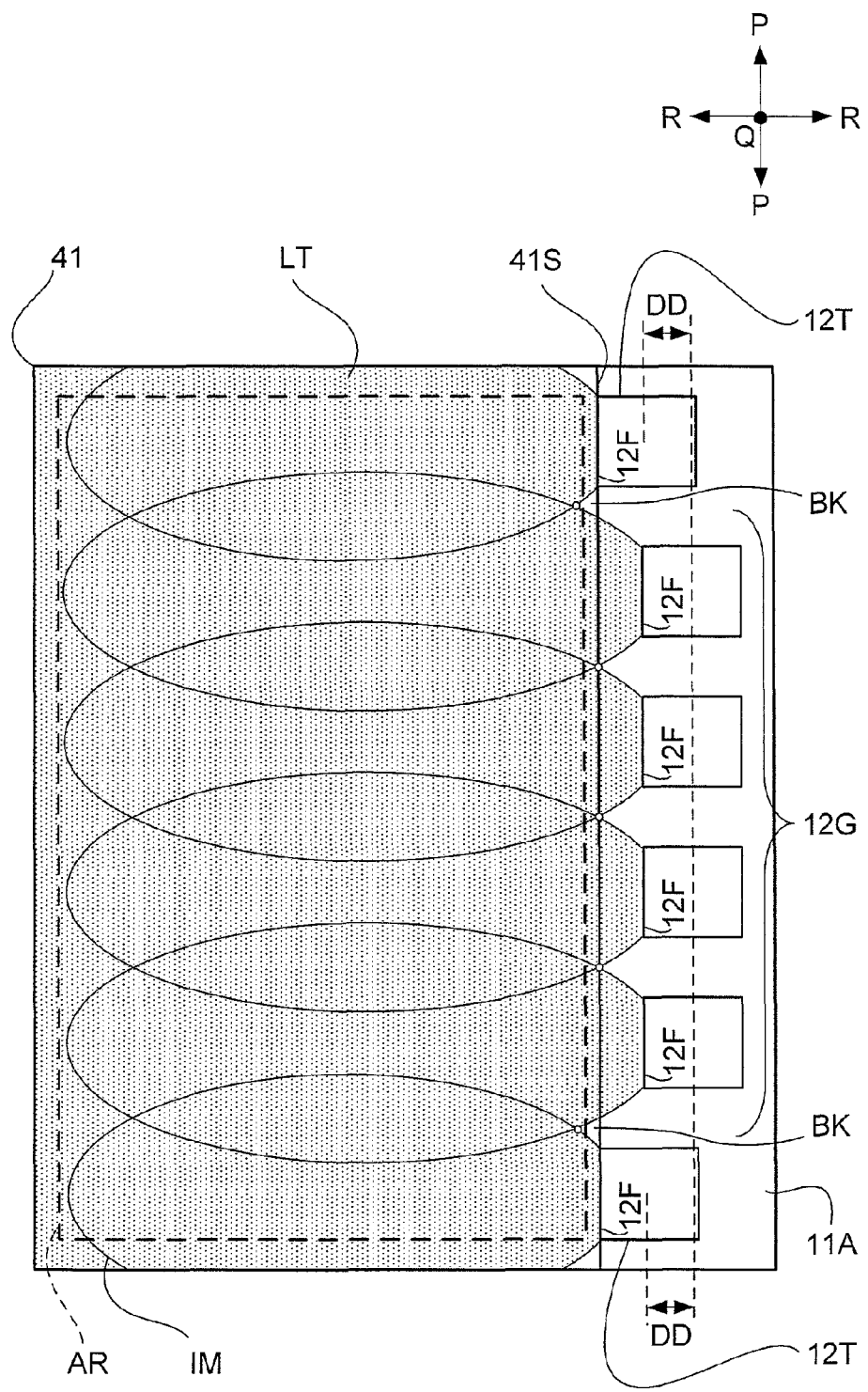
[FIG. 1] is a plan view of a light guide plate that receives light from a LED module.

MJ LED module (light emitting module)
11 mount board (support board)
11A mount surface
12 LED (light emitting element)
12F light emitting surface of LED
12G group of linear LEDs (group of linear light emitting elements)
12T deviating LED (deviating light emitting element)
41 light guide plate
41S side surface of light guide plate
41U top surface of light guide plate
41B bottom surface of light guide plate
BD adhesive
42 reflection sheet
43 diffusion sheet
44 optical sheet
45 optical sheet
49 backlight unit
59 liquid crystal display panel
69 liquid crystal display device

BEST MODE FOR CARRYING OUT THE INVENTION (Embodiment 1)

Description of an embodiment based on drawings is as follows. Here, for convenience, there is a case where hatching, member numbers and the like are omitted; in such a case, other drawings are referred to. Besides, a black circle in a drawing means a direction perpendicular to a paper surface.

Figure 2:
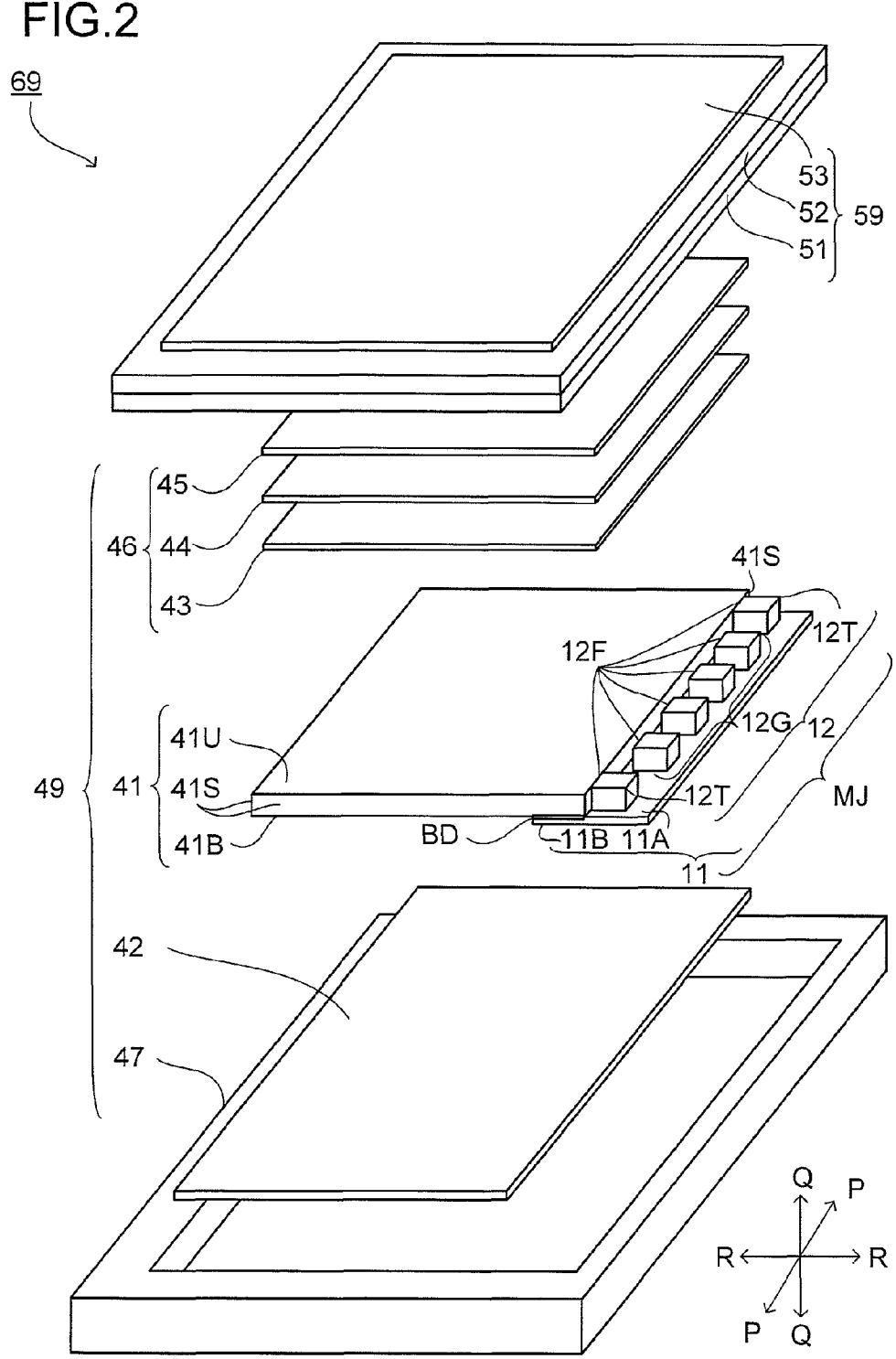
[FIG. 2] is an exploded perspective view of a liquid crystal display device.
Figure 3A:
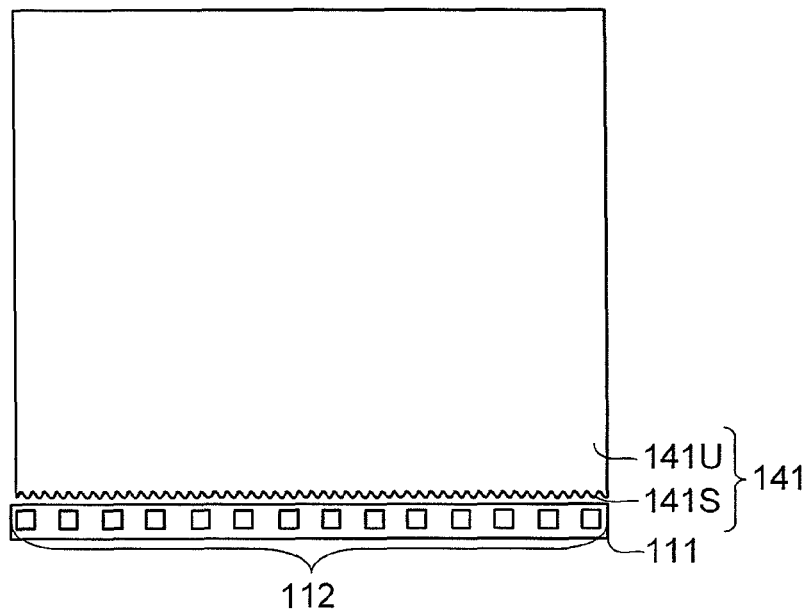
[FIG. 3A] is a plan view of a light guide plate that receives light from a LED module in a conventional backlight unit.
Figure 3B:
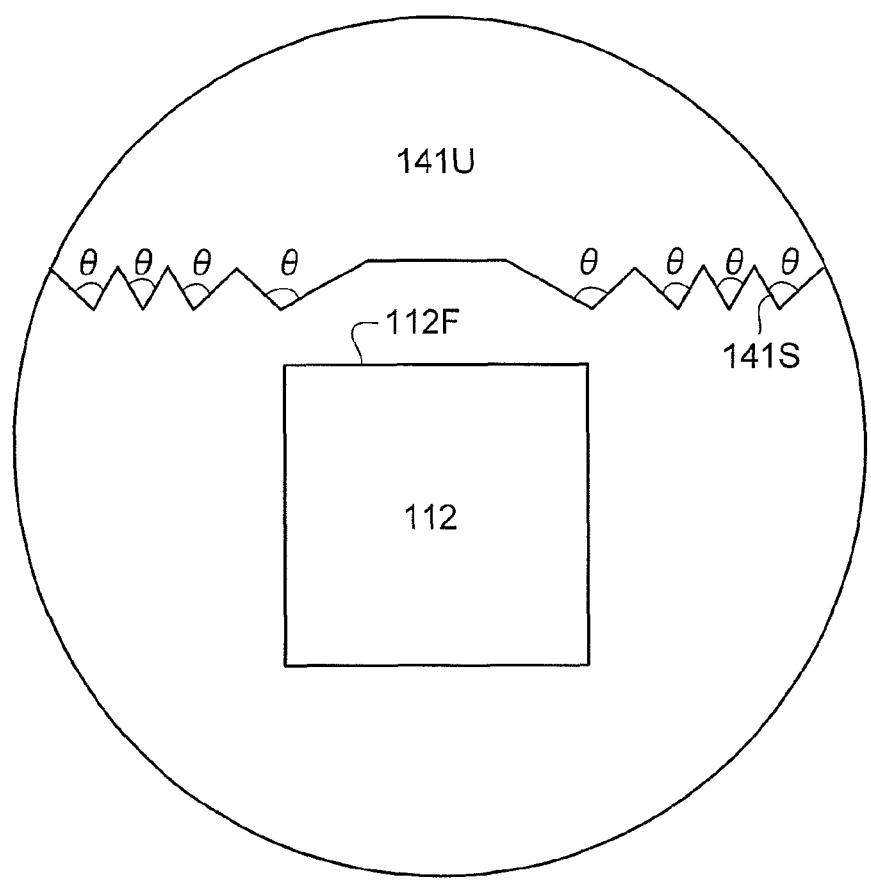
[FIG. 3B] is a partially enlarged view of FIG. 3A.
Figure 4:
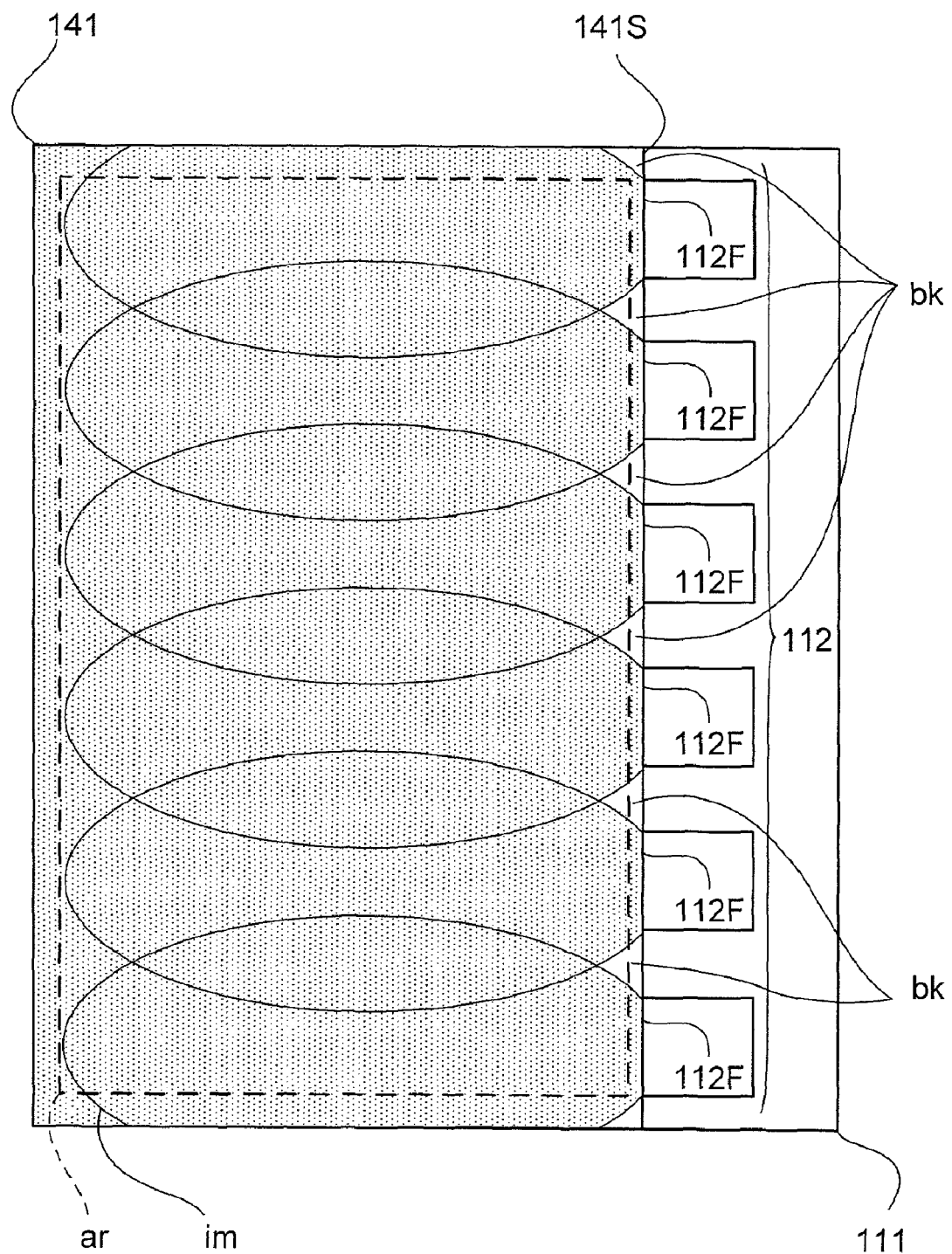
[FIG. 4] is a plan view of a light guide plate that receives light from a LED module in a conventional backlight unit.

FIG. 2 is an exploded perspective view of a liquid crystal display device 69. As shown in this figure, the liquid crystal display device 69 includes a liquid crystal display panel 59 and a backlight unit 49.

In the liquid crystal display panel 59, an active matrix board 51 that includes switching elements such as a TFT (Thin Film Transistor) and the like and an opposite board 52 that faces the active matrix board 51 are attached to each other with a seal member (not shown). And, liquid crystal, not shown, is injected into the gap between both boards 51, 52 (here, deflection films 53, 53 are so attached as to sandwich the active matrix board 51 and the opposite board 52).

Because the liquid crystal display panel 59 is a non-light emitting type display panel, the liquid crystal display panel 59 performs a display function by receiving the light (backlight light) from the backlight unit 49. Because of this, if it is possible to evenly direct the light from the backlight unit 49 to the entire surface of the liquid crystal display panel 59, the display quality of the liquid crystal display panel 59 improves.

To generate the backlight light, the backlight unit 49 includes: a LED module (light emitting module) MJ; a light guide plate 41; a reflection sheet 42; a diffusion sheet 43; optical sheets 44, 45; and a housing 47.

The LED module MJ is a module that emits light, and includes: a mount board (support board) 11; and a LED (Light Emitting Diode) 12 that is mounted on an electrode of the mount board 11, receives supply of an electric current and emits light.

It is sufficient that the mount board 11 is a circuit board which includes a wiring to guide an electric current to the LED 12. And, in a case of a circuit board, the mount board 11 is not especially limited. For example, the mount board 11 may be a flexible circuit board (FPC board; Flexible Printed Circuits board) that is formed of a polyimide resin and the like and has flexibility or may be a hard circuit board that is formed of a glass epoxy resin and the like.

Here, it is desirable that the LED module MJ includes a plurality of LEDs 12 to secure a light amount and further it is desirable that the LEDs 12 are linearly arranged in parallel on a mount surface (support surface) 11A of the mount board 11 (here, the LEDs 12 linearly arranged are also called a group of linear LEDs 12G). However, in the figure, for convenience, only part of the LEDs 12 are represented (here, hereinafter, the direction in which the LEDs 12 are arranged is called a parallel direction P).

The light guide plate 41 is a plate-shape member that includes: a side surface 41S; and a top surface 41U and a bottom surface 41B that are so situated as to sandwich the side surface 41S. And, a surface (light receiving surface) of the side surface 41S faces a light emitting surface 12F of the LED 12, thereby receiving the light from the LED (light emitting element, a point light source) 12. The received light is mixed in the light guide plate 41 and emitted as surface light from the top surface 41U. Here, as adhesive BD is disposed between the bottom surface 41B of the light guide plate 41 and the mount surface 11A of the mount board 11, so that the LED module MJ is attached to the light guide plate 41.

The reflection sheet 42 is so situated as to be covered by the light guide plate 41. And, a surface of the reflection sheet 42 that faces the bottom surface 41B of the light guide plate 41 serves as a reflection surface. Because of this, this reflection surface reflects the light from the LED 12 and the light that propagates in the light guide plate 41 back into the light guide plate 41 (in detail, via the bottom surface 41B of the light guide plate 41) without allowing both light to leak.

The diffusion sheet 43 is so situated as to cover the top surface 41U of the light guide plate 41; and diffuses the surface light from the light guide plate 41 to spread the light across the entire region of the liquid crystal display panel 59 (here, this diffusion sheet 43 and the optical sheets 44, 45 are also collectively called an optical sheet group 46).

The optical sheets 44, 45 each is an optical sheet that has a prism shape in a sheet surface, for example, deflects a radiation characteristic of light and is so situated as to cover the diffusion sheet 43. Because of this, the optical sheets 44, 45 collect the light that advances from the diffusion sheet 43 to improve the brightness. Here, the divergent directions of each light collected by the optical sheet 44 and the optical sheet 45 are in a relationship to intersect each other.

The housing 47 houses: the LED module MJ; the reflection sheet 42; the light guide plate 41; the diffusion sheet 43; and the optical sheets 44, 45 and the like. In detail, the reflection sheet 42, the light guide plate 41, the diffusion sheet 43, the optical sheets 44, 45 are piled up in this order and housed in the housing 47 (here, hereinafter, the direction in which the members are piled up is called a pile-up direction Q and the direction perpendicular to the parallel direction P of the LEDs 12 and to the pile-up direction Q is called a direction R).

And, in the above backlight unit 49, the light from the LED 12 is formed into the surface light by the light guide plate and emitted from the light guide plate 41; the surface light passes through the optical sheet group 46 and is emitted as the backlight light whose light brightness is increased. And, the backlight light reaches the liquid crystal display panel 59 and the liquid crystal display panel 59 displays an image by means of the backlight light. Here, the structure of the above optical sheet and the like in the backlight unit 49 are examples and a suitable modification is possible.

Here, the LED module MJ and the light guide plate 41 are described in detail by using FIG. 1 and FIG. 2. FIG. 1 is a plan view of the light guide plate 41 and the LED module MJ when seen from the top surface 41U side of the light guide plate 41.

Here, a broken-line region in FIG. 1 means a light supply region AR of the backlight unit 49 that supplies light to an effective display region of the liquid crystal display panel 59. Besides, a region drawn by reticulate points means that sufficient light is supplied to the light guide plate 41; and a line IM is an imaginary line that represents a divergent state of the light from a single LED 12).

As shown in FIG. 1, the LED 12 in the LED module MJ turns the light emitting surface 12F toward the side surface 41S of the light guide plate 41 and is arranged along a longitudinal direction of the side surface 41S. However, there is a LED (deviating LED) 12T that deviates from a group of linear LEDs 12 (group of linear LEDs 12G).

The deviating LED 12T is situated at both ends of the plurality of LEDs 12 arranged on the mount board 11. And, this deviating LED 12T deviates from the remaining LEDs 12 (group of linear LEDs 12G) arranged linearly toward the light emitting side of the LED 12. And, the distance between the deviating LEDs 12T is equal to or shorter than the longitudinal length of the side surface 41S of the light guide plate 41.

In short, if the LED module MJ is disposed at a predetermined position from the side surface 41S of the light guide plate 41, the deviating LED 12T is situated at the longitudinal end of the side surface 41S of the light guide plate 41 in such a way that the deviating LED 12T is able to supply light. Further, the light emitting surface 12F of the deviating LED 12T comes into contact with the side surface 41S of the light guide plate 41.

In detail, as shown in FIG. 1, the light emitting surface 12F of the deviating LED 12T comes into contact with the side surface 41S of the light guide plate 41, so that the distance between the group of linear LEDs 12G and the side surface 41S of the light guide plate 41 is defined (in short, the deviating LED 12T functions as a positioning member). As a result of this, the light emitting surface 12F of the deviating LED 12T comes into tight contact with the side surface 41S of the light guide plate 41; however, the light emitting surface 12F of the group of linear LEDs 12G goes away from the side surface 41S of the light guide plate 41 by a predetermined distance.

According to this, the light from the group of linear LEDs 12G diverges from the light emitting surface 12F of each LED 12 and enters the side surface 41S of the light guide plate 41. In addition, the position (boundary point; see a white circle) where both light from adjacent LEDs 12 intersect each other comes to a position relatively near the side surface 41S of the light guide plate 41.

A dark region BK where the light from the LED 12 does not enter occurs on a side near the LED 12 from the position where both light from the adjacent LEDs 12 intersect each other (here, a region other than the dark region BK where the light from the LED 12 enters is called a bright region LT).

However, as shown in FIG. 1, in the case where the boundary point is situated at a position relatively near the side surface 41S of the light guide plate 41, the space of the dark region BK in the light guide plate 41 becomes small (or disappears) compared with a case where the boundary point is situated at a position relatively far from the side surface 41S of the light guide plate 41. Accordingly, the backlight unit 49 is unlikely to emit light that has light-amount unevenness (brightness unevenness) due to the dark region BK.

In other words, even if no machining is applied to the light guide plate 41, this LED module MJ prevents light-amount unevenness in the emitted light from the light guide plate 41. Besides, because the light guide plate 41 is produced without special machining, the mold is inexpensive. In addition, because other members are not necessary for the positioning of the LED module MJ with respect to the light guide plate 41, the cost of the backlight unit 49 also becomes inexpensive.

Besides, even in a case where modification of the backlight unit 49 becomes necessary to prevent light-amount unevenness, only designing (e.g., the mold to produce the mount board 11) of the LED module MJ is sufficient without modifying the light guide plate 41. Accordingly, the cost of the backlight unit 49 becomes inexpensive.

Besides, because the position of the LED module MJ with respect to the light guide plate 41 is decided by only applying the deviating LED 12T to the side surface 41S of the light guide plate 41, the production burden of the backlight unit 49 is slight.

Here, in the above LED module MJ, as shown in FIG. 1 and FIG. 2, it is desirable that the LED 12 is of a side-surface light emitting type that emits light in the same direction as the in-the-surface direction (in-the-board surface direction) of the mount surface 11A of the mount board 11.

According to this, in the LED module MJ, it is possible to easily deviate the position of the LED 12 along the light-emission direction (direction R) of the LED 12. Because of this, in the LED module MJ, the distance between the side surface 41S of the light guide plate 41 and the light emitting surface 12F of the LED 12 is easily changed, which prevents light-amount unevenness of the backlight light.

Besides, such side-surface light emitting type LED 12 is usually small and thin compared with an upper-surface light emitting type LED (LED that emits light in a direction (e.g., a vertical direction) which intersects the mount surface 11A of the mount board 11). Because of this, the LED module MJ that uses such side-surface light emitting type LED 12 is small and the backlight unit 49 that incorporates the LED module MJ also becomes small.

In contrast, the upper-surface light emitting type LED is large and thick compared with the side-surface light emitting type LED 12; in addition, in the LED module MJ that incorporates the upper-surface light emitting type LED, it is impossible to change the distance between the side surface 41S of the light guide plate 41 and the light emitting surface of the LED by only changing the position of the LED on the mount surface. Accordingly, such LED module MJ is large and it is hard to prevent light-amount unevenness of the backlight light.

Because of this, in a backlight unit in which the LED module incorporating the upper-surface light emitting type LED is built, light-amount unevenness may be prevented by changing the shape of the side surface 41S of the light guide plate 41 rather than changing the distance between the side surface 41S of the light guide plate 41 and the light emitting surface of the LED. However, the mold to produce the light guide plate 41 is extremely expensive. Because of this, to prevent light-amount unevenness of the backlight light by changing the shape of the side surface 41S of the light guide plate 41, a high cost is unavoidable.

However, the backlight unit 49, in which the LED module MJ incorporating the side-surface light emitting type LED 12 is built, prevents light-amount unevenness of the backlight light by only changing the position of the LED 12 without changing the shape of the side surface 41S of the light guide plate 41. And, the cost to change the mold for the production of the mount board 11 for the position changing of the LED 12 is much cheaper than the cost to change the mold for the production of the light guide plate 41.

Here, in the above LED module MJ, as shown in FIG. 1, the deviating LEDs 12T are situated at both ends of the LEDs 12 arranged linearly on the mount board it However, this is not limiting; and it is sufficient that at least one of the LEDs 12 arranged linearly serves as the deviating LED 12T (e.g., the LED 12 at either of both ends of the line may serve as the deviating LED 12T).

Besides, as shown in FIG. 1, it is desirable that the distance (DD) by which the deviating LED 12T deviates from the LEDs 12 (group of linear LEDs 12G) arranged linearly meets the following conditional formula (1). This conditional formula (1) means that the deviating LED 12T deviates from the group of linear LEDs 12G by a distance larger than the distance of a mount tolerance of the LED 12 with respect to the mount board 11.

$$AD < DD \qquad \text{conditional formula (1)}$$

where

AD: a distance of a tolerance between the LEDs 12 that occurs in a direction (direction R) which intersects the line of the LEDs 12 in a case where the LEDs 12 are supported by the support board 11 (in short, on the support surface 11A).

DD: a distance between the deviating LED 12T and the group of the LEDs 12G in a direction that intersects the line of the LEDs 12.

[Other Embodiments]

Here, the present invention is not limited to the above embodiments; and various modifications are possible without departing from the spirit of the present invention.

For example, in FIG. 1, the light from the LED module MJ enters only one of the side surfaces 41S of the light guide plate 41; however, this is not limiting. For example, the LED modules MJ, MJ may emit light to the opposite side surfaces 41S, 41S, respectively.

And, it is desirable that in each LED module MJ, the deviating LED 12T is applied to the side surface 41S of the light guide plate 41.

The invention claimed is:

1. A light emitting module that supplies light to a light guide plate, the light emitting module comprising: a plurality of light emitting elements; and a support board which arranges and supports the light emitting element;

wherein of the plurality of the light emitting elements, a group of linear light emitting elements that are arranged in a line is included, and at least a deviating light emitting element that deviates from the line toward a light emitting side of the light emitting element is included; and a light emitting surface the deviating light emitting element comes into contact with a side surface of the light guide plate, so that light emitting surfaces of the group of linear light emitting elements do not come into contact with the side surface of the light guide plate, a position of the group of linear light emitting elements is set at a position away from the side surface of the light guide plate by a predetermined distance, and the light emitting module meets the following conditional formula (1);

$$AD < DD \qquad \text{conditional formula (1)}$$

where

AD: a distance of a positional tolerance between the light emitting elements that occurs in a direction which intersects the line of the light emitting elements, and DD: a distance between the deviating light emitting element and the group of the light emitting elements in a direction that intersects the line of the light emitting elements.

2. The light emitting module according to claim 1, wherein the light emitting element is of a side-surface light emitting type that emits light in the same direction as an in-the-board-surface direction of the support board.

3. The light emitting module according to claim 1, wherein the deviating light emitting element is situated at one end or both ends of the group of light emitting elements.

4. The light emitting module according to claim 1, wherein the support board is a circuit board that includes a wiring which guides an electric current to the light emitting element.

5. The light emitting module according to claim 4, wherein the circuit board is a flexible circuit board.

6. The light emitting module according to claim 4, wherein the circuit board is a hard circuit board.

7. The light emitting module according to claim 1, wherein the light emitting element is a LED.

8. A backlight unit comprising;
the light emitting module described in claim 1; and
a light guide plate that receives light from the light emitting module.

9. A liquid crystal display device comprising:
the backlight unit described in claim 8; and
a liquid crystal display panel that receives light from the backlight unit.

10. A backlight unit comprising;
the light emitting module described in claim 2; and
a light guide plate that receives light from the light emitting module.

11. A backlight unit comprising:
the light emitting module described in claim 3; and
a light guide plate that receives light from the light emitting module.

12. A backlight unit comprising:
the light emitting module described in claim 1; and
a light guide plate that receives light from the light emitting module.

13. A backlight unit comprising:
the light emitting module described in claim 4; and
a light guide plate that receives light from the light emitting module.

14. A backlight unit comprising:
the light emitting module described in claim 5; and
a light guide plate that receives light from the light emitting module.

15. A backlight unit comprising:
the light emitting module described in claim 6; and
a light guide plate that receives light from the light emitting module.

16. A backlight unit comprising:
the light emitting module described in claim 7; and
a light guide plate that receives light from the light emitting module.

* * * * *